United States Patent
Tanabe et al.

(10) Patent No.: US 8,697,788 B2
(45) Date of Patent: Apr. 15, 2014

(54) POLYCARBONATE RESIN COMPOSITION AND MOLDED ARTICLE THEREOF

(75) Inventors: Seiichi Tanabe, Chiyoda-ku (JP); Atsushi Kitamura, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 234 days.

(21) Appl. No.: 13/322,613

(22) PCT Filed: May 28, 2010

(86) PCT No.: PCT/JP2010/059298
§ 371 (c)(1),
(2), (4) Date: Nov. 28, 2011

(87) PCT Pub. No.: WO2010/137729
PCT Pub. Date: Dec. 2, 2010

(65) Prior Publication Data
US 2012/0095141 A1    Apr. 19, 2012

(30) Foreign Application Priority Data
May 28, 2009  (JP) ................................. 2009-128988

(51) Int. Cl.
*C08K 5/5317* (2006.01)
(52) U.S. Cl.
USPC ......... 524/115; 524/126; 524/151; 264/328.1
(58) Field of Classification Search
USPC ....................................................... 524/115
See application file for complete search history.

(56) References Cited

U.S. PATENT DOCUMENTS 7,148,313 B2 * 12/2006 Koga et al. ................... 528/196
2007/0155888 A1 * 7/2007 Imamura et al. ............. 524/442

FOREIGN PATENT DOCUMENTS

| EP | 0 352 458 | 1/1990 |
| JP | 62-034791 | 2/1987 |
| JP | 02-069556 | 3/1990 |
| JP | 3285690 | 12/1991 |
| JP | 2579653 | 2/1997 |
| JP | 9-157510 | 6/1997 |
| JP | 9-272757 | 10/1997 |
| JP | 2001-192543 | 7/2001 |
| JP | 2004-27105 | 1/2004 |
| JP | 2004-027106 | 1/2004 |
| JP | 4046159 | 11/2007 |

OTHER PUBLICATIONS

International Search Report issued Jun. 29, 2010 in International (PCT) Application No. PCT/JP2010/059298, of which the present application is the national stage.
International Preliminary Report on Patentability together with English translation of the Written Opinion issued Dec. 22, 2011 in International (PCT) Application No. PCT/JP2010/059298.

* cited by examiner

*Primary Examiner* — Doris Lee
(74) *Attorney, Agent, or Firm* — Wenderoth, Lind & Ponack, L.L.P.

(57) ABSTRACT

This invention seeks to provide a resin composition and a molded article which are excellent in transparency, weatherability, resistance to boiling water and resistance to molding heat, which have an internal strain reduced and which are excellent in breaking durability.
This invention is a resin composition comprising
(A) 100 parts by weight of a polycarbonate resin (component A),
(B) 0.005 to 1 part by weight of an ester (component B) of pentaerythritol and an aliphatic carboxylic acid,
(C) 0.003 to 0.2 part by weight of an epoxy compound (component C),
(D) 0.01 to 1 part by weight of an ultraviolet absorbent (component D), and
(E) 0.001 to 0.5 part by weight of a phosphorus stabilizer (component E),
wherein the components B and the component C have a critical stress of 12 MPa or more each when they are treated at a temperature of 120° C. for 24 hours in a one/fourth ellipse test method using a bisphenol A type polycarbonate resin sheet that is produced by a melt-extrusion method and has a viscosity average molecular weight of 24,500, and a molded article thereof.

12 Claims, 3 Drawing Sheets

[2-A]

[2-B]

POLYCARBONATE RESIN COMPOSITION AND MOLDED ARTICLE THEREOF

TECHNICAL FIELD

This invention relates to a polycarbonate resin composition and a molded article thereof. More specifically, this invention relates to a polycarbonate resin composition suitable for a transparent member for a vehicle and a molded article thereof.

BACKGROUND ART

Having excellent transparency, heat resistance and mechanical strength, a polycarbonate resin is widely used in the fields of electricity, machines, automobiles and medical use. On the other hand, a polycarbonate resin is widely used for various transparent members owing to the above excellent properties. Above all, attempts are made to apply it to transparent members for automobiles that seek to decrease the weight thereof. These transparent members for automobiles include a headlamp lens, a resin window glass, a rear lamp lens and a meter cover. These members have characteristic features that they have complicated forms and large sizes and that qualities that are demanded for molded articles are very high.

When these articles are produced from a polycarbonate resin composition by an injection molding method, there is a problem that it is difficult to obtain a molded article that has excellent releasability from a mold and a decreased internal strain therein and that is free of breaking. Specifically, when excellent releasability from a mold is provided, an internal strain in a molded article or the breaking of a molded article is liable to take place. On the other hand, when releasability from a mold is decreased, the breaking of a molded article by an increase in resistance against the releasing thereof from a mold is increased. In addition to these problems, it is required to have excellent transparency, resistance to boiling water, resistance to molding heat and weatherability.

The above internal strain in a molded article generally refers to a well known strain that is observed as a streaks-like color change or non-uniformity of denseness and non-denseness through a polarizing plate and that is decreased to some extent by annealing treatment (this strain will be sometimes referred to as "strain-1" for the convenience). On the other hand, there is also a strain that is observed as a non-uniform shadow portion in observation through polarizing plates (this strain will be sometimes referred to as "strain-2" for the convenience) and that is not decreased by normal annealing treatment but sometimes becomes conspicuous in reverse.

The substance of the strain-1 is a strain that individual polymer chains have due to thermal stress. The strain-2 is liable to take place when the molding temperature during molding is high and when a molding machine is large and has a large residence portion. The strain-1 constitutes a factor that causes a cracking in treatment for hard coating or long-term properties, and its decreasing is hence required. The strain-2 has failures such as the occurrence of silver, discoloration and internal cloudiness (white fogging) which may appear on/in a molded article due to a slight increase in a residence time period, and it is required to decrease these.

These transparent members for a vehicle are surface-treated with hard coating treatment, etc., in many cases. In the above hard coating treatment, however, molded articles sometimes get broken. Such a breaking of a molded article also takes place even if the molded article has been subjected to annealing treatment before the hard coating treatment. It is hence considered that some property of a polycarbonate resin composition may promote the breaking of a molded article both during molding and during annealing. It is required to decrease the factor for such a breaking in order to improve a molded article in durability against breaking (to be sometimes simply referred to as "breaking durability" hereinafter).

Conventionally, a method of incorporating a fatty acid ester is widely known as a method of improving the releasability of a polycarbonate resin from a mold, and in particular, glycerin monostearate is often used. In a polycarbonate resin composition into which glycerin monostearate is incorporated, the above strain-2 is clearly observed, and it cannot be said that the polycarbonate resin composition has been sufficient for the durability against breaking.

As a mold release agent for use with a polycarbonate resin, there is also widely used a full ester of a polyhydric alcohol and an aliphatic carboxylic acid, such as pentaerythritol tetrastearate. Concerning a polycarbonate resin composition containing the above full ester, various proposals have been made as well for further improving its product qualities. An ester of a polyhydric alcohol and an aliphatic carboxylic acid will be sometimes simply referred to as "fatty acid ester" hereinafter.

Patent Document 1 discloses a polycarbonate resin composition containing an ester of pentaerythritol in which the OH group content and acid value of an ester compound are made extremely small. However, the primary object of the invention described in the patent document is to decrease the ductility-brittleness transition temperature of the above resin composition (that is, the ductility temperature region is increased).

Further, Patent Document 2 discloses a polycarbonate resin composition comprising a polycarbonate resin and an internal mold release agent having a full ester percentage of 90% or more, an acid value of 0.6 to 1.6, an iodine value of 0.1 to 1.3 and a metal element, Sn, content of 5 to 300 ppm. The above official gazette discloses that when the acid value exceeds 1.6, the resistance to molding heat is decreased, while it does not disclose the sufficient technical findings of a polycarbonate resin composition that satisfies any one of excellent releasability from a mold, a decreased internal strain in a molded article (in particular, strain-2) and improved breaking durability.

As described above, the transparent members for a vehicle require a polycarbonate resin composition having excellent releasability from a mold, a decreased internal strain in a molded article and improved breaking durability in addition to excellent transparency, weatherability and resistance to molding heat. Further, the transparent members for a vehicle are used outdoors in many cases, and in particular exposed to a high-temperature high-humidity state for a long time in the summer season, so that they are required to have resistance to heat and moisture at high temperatures.

Patent Document 3 discloses that a polycarbonate resin composition having excellent transparency, weatherability, resistance to molding heat and releasability from a mold, having a decreased internal strain in a molded article and having durability against breaking can be obtained by adding a specific mold release agent and ultraviolet absorbent to a polycarbonate resin. However, when a phosphorus stabilizer is used for improving resistance to molding heat, there is a problem that the phosphorus stabilizer is converted to an acidic compound due to hydrolysis to deteriorate the resistance of a molded article to heat and moisture.

Patent Document 4 discloses that a polycarbonate resin composition excellent in thermal stability and water resistance can be obtained by adding a combination of a specific phosphorus compound, a phenolic compound and an epoxy compound to a polycarbonate resin. However, there is not any composition that satisfies all of the properties that are required of transparent members for a vehicle.

Meanwhile, a polycarbonate resin composition has a problem that it promotes the corrosion of a mold after its molding is finished. Normally, when its molding is continuously carried out, no corrosion problem is caused since the amount of water (moisture) is small. However, when molding is stopped for a while, the problem of corrosion of a mold takes place. That is considered to be because an acidic substance generated by decomposition of a trace amount of a chlorine-based organic solvent or additive contained in a polycarbonate and an acidic impurity contained in an additive are exposed to moisture in an adhering state thereof to a mold surface, thereby to extremely promoting the corrosion of a mold.

Patent Document 5 discloses that a polycarbonate resin composition having an effect on the inhibition of corrosion of a mold can be obtained by adding a partial ester of a higher fatty acid such as glycerin monostearate and a polyhydric alcohol to a polycarbonate resin.

Patent Document 6 discloses a polycarbonate resin in which the corrosion of a mold is inhibited by adding an alicyclic epoxy compound to a polycarbonate resin. However, there is not any composition that satisfies properties required of transparent members for a vehicle.
(Patent Document 1) JP 02-069556A
(Patent Document 2) JP 2001-192543A
(Patent Document 3) Japanese Patent No. 4046159
(Patent Document 4) Japanese Patent No. 3285690
(Patent Document 5) JP 62-034791B
(Patent Document 6) Japanese Patent No. 2579653

DISCLOSURE OF THE INVENTION

It is an object of this invention to provide a resin composition containing a polycarbonate resin and having excellent transparency, weatherability, resistance to boiling water and resistance to molding heat and a molded article thereof. Further, it is another object of this invention to provide a resin composition excellent in releasability from a mold and an effect on the inhibition of corrosion of a mold. It is still another object of this invention to provide a molded article having a decreased internal strain and excellent durability against breaking. It is yet another object of this invention to provide a resin composition suitable for transparent members for a vehicle.

The present inventors have found that a resin composition obtained by adding a specific fatty acid ester (component B), a specific epoxy compound (component C), an ultraviolet absorbent (component D) and a phosphorus stabilizer (component E) to a polycarbonate resin (component A) can solve the above problems, and this invention is accordingly completed.

That is, according to this invention, there are provided,
1. a resin composition comprising
    (A) 100 parts by weight of a polycarbonate resin (component A),
    (B) 0.005 to 1 part by weight of an ester of pentaerythritol and an aliphatic carboxylic acid (component B),
    (C) 0.003 to 0.2 part by weight of an epoxy compound (component C),
    (D) 0.01 to 1 part by weight of an ultraviolet absorbent (component D), and
    (E) 0.001 to 0.5 part by weight of a phosphorus stabilizer (component E), wherein the component B and the component C have a critical stress of 12 MPa or more each when they are treated at a temperature of 120° C. for 24 hours in a one/fourth ellipse test method using a bisphenol A type polycarbonate resin sheet that is produced by a melt-extrusion method and has a viscosity average molecular weight of 24,500, 2. a resin composition as recited in the above 1, wherein the phosphorus stabilizer (component E) is at least one compound selected from a phosphite compound and a phosphonite compound, 3. a resin composition as recited in the above 1 or 2, which contains 0.001 to 0.5 part by weight, per 100 parts by weight of the polycarbonate resin (component A), of a hindered-phenol stabilizer (component F), 4. a molded article obtained by injecting-molding the resin composition recited in any one of the above 1 to 3, and 5. a molded article as recited in the above 4, which is a transparent member for a vehicle.

EXPLANATIONS OF LETTERS OR NUMERALS

Figure 1:
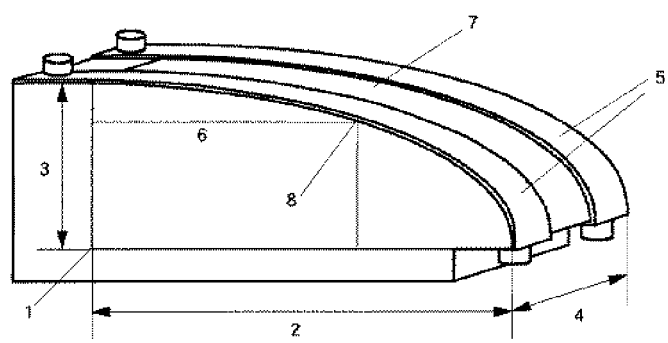
FIG. 1 shows a schematic drawing of a tool for a one fourth ellipse test for measuring a critical stress of a mold release agent.

1. Center of ellipse
2. Diameter (10 cm) of major axis of ellipse
3. Diameter (4 cm) of minor axis of ellipse
4. Width (4 cm) of tool
5. Press fittings (1 cm wide each)
6. Horizontal distance (cm) from center of ellipse to a portion where a crack occurs from the smallest strain
7. Polycarbonate resin sheet
8. Portion where a crack occurs from the smallest strain
11. Headlamp lens body
12. Dome-like portion of lens
13. Circumferential portion of lens
14. Gate of molded article (width 30 mm, thickness of gate portion 4 mm)
15. Sprue (diameter of gate portion 7 mmφ)
16. Diameter (220 mm) of circumferential portion of lens
17. Diameter (200 mm) of dome portion of lens
18. Height (20 mm) of dome portion of lens
19. Thickness (4 mm) of lens molded article
20. Gate
21. Sprue
22. Insert for evaluation of corrosion (steel material NAK 80, 20 mmφ)

BEST MODE FOR CARRYING OUT THE INVENTION

Details of this invention will be further explained below.
(Polycarbonate Resin: Component A)

The polycarbonate resin (component A) is obtained by reacting dihydric phenol with a carbonate precursor. Examples of the reaction method include an interfacial polymerization method, a melt ester exchange method, a method of solid phase ester exchange of carbonate prepolymer and a method of ring-opening polymerization of a cyclic carbonate compound.

Typical examples of the above dihydric phenol include hydroquinone, resorcinol, 4,4'-biphenyl, 1,1-bis(4-hydroxyphenyl)ethane, 2,2-bis(4-hydroxyphenyl)propane (so-called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene and 9,9-bis(4-hydroxy-3-methylphenyl)fluorene. The polycarbonate resin (component A) can be selected from homopolymers of the above dihydric phenols and copolymers composed from two or more kinds of dihydric phenols.

Of these, there are preferably used homopolymers of bis(4-hydroxyphenyl)alkanes such as bisphenol A and copolymers composed from two or more kinds of dihydric phenols selected from 1,1-bis(4-hydroxyphenyl)-3,3,5-trimethylcyclohexane, bis(4-hydroxyphenyl)alkanes (bisphenol A, etc.), 2,2-bis{(4-hydroxy-3-methyl)phenyl}propane, α,α'-bis(4-hydroxyphenyl)-m-diisopropylbenzene and 9,9-bis(4-hydroxy-3-methylphenyl)fluorene. In particular, a homopolymer of bisphenol A is preferred.

The carbonate precursor is selected from carbonyl halide, carbonate diester or haloformate. Specifically, it includes phosgene, diphenyl carbonate and dihaloformate of dihydric phenol.

When the polycarbonate resin is produced from the dihydric phenol and the carbonate precursor by various polymerization methods, there may be used a catalyst, a terminal stopper and an antioxidant for preventing the oxidation of the dihydric phenol as required. Further, the polycarbonate resin (component A) includes a branched polycarbonate resin obtained by copolymerizing a trifunctional or higher polyfunctional aromatic compound, a polyester carbonate resin obtained by copolymerizing an aromatic or aliphatic (including "alicyclic") difunctional carboxylic acid, a copolycarbonate resin obtained by copolymerizing a dihydric alcohol (including alicyclic alcohol), and a polyester carbonate resin obtained by copolymerizing both the above difunctional carboxylic acid and dihydric alcohol. Further, it may be a mixture of two or more polycarbonate resins obtained.

The trifunctional or higher polyfunctional aromatic compound can be selected from 1,1,1-tris(4-hydroxyphenyl)ethane, or 1,1,1-tris(3,5-dimethyl-4-hydroxyphenyl)ethane.

When a polyfunctional compound that generates a branched polycarbonate is contained, the content thereof in the total polycarbonate amount is 0.001 to 1 mol %, preferably 0.005 to 0.9 mol %, particularly preferably 0.01 to 0.8 mol %. In particular, in the melt ester exchange method, a branched structure can be generated as a side reaction. The content of the above branched structure in the total polycarbonate amount is also 0.001 to 1 mol %, preferably 0.005 to 0.9 mol %, particularly preferably 0.01 to 0.8 mol %. These contents can be calculated by $^1$H-NMR measurements.

The aliphatic difunctional carboxylic acid is preferably α,ω-dicarboxylic acid. Examples of the aliphatic difunctional carboxylic acid preferably include linear saturated aliphatic dicarboxylic acids such as sebacic acid (decanedioic acid), dodecanedioic acid, tetradecanedioic acid, octadecanedioic acid and eicosanedioic acid, and alicyclic dicarboxylic acids such as cyclohexanedicarboxylic acid. As the dihydric alcohol, an alicyclic diol is suitable, and examples thereof include cyclohexanedimethanol, cyclohexanediol and tricyclodecanedimethanol.

Further, there can be also used a polycarbonate-polyorganosiloxane copolymer obtained by copolymerizing a polyorganosiloxane unit.

A reaction according to an interfacial polymerization method is normally a reaction between a dihydric phenol and phosgene, and they are allowed to react in the presence of an acid binder and an organic solvent. The acid binder is selected, for example, from alkali metal hydroxides such as sodium hydroxide and potassium hydroxide or pyridine. The organic solvent is selected, for example, from hydrocarbon halides such as methylene chloride and chlorobenzene.

Further, a catalyst such as a tertiary amine or a quaternary amine can be used for promoting the reaction, and monofunctional phenols such as phenol, p-tert-butyl phenol and p-cumyl phenol are preferably used as a molecular weight modifier. The monofunctional phenols further include decyl phenol, dodecyl phenol, tetradecyl phenol, hexadecyl phenol, octadecyl phenol, eicosyl phenol, docosyl phenol and triancontyl phenol. These monofunctional phenols having alkyl groups having relatively long chains are effective when improvements in fluidity and hydrolyzability are required.

The reaction temperature is normally 0 to 40° C., the reaction time period is several minutes to 5 hours, and it is preferred to maintain a pH during reaction at 10 or more.

The reaction according to a melting method is normally an ester exchange reaction between a dihydric phenol and a carbonate diester, and in the presence of an inert gas, the dihydric phenol and the carbonate diester are mixed and react under reduced pressure normally at 120 to 350° C. The degree of reduced pressure is changed stepwise, and it is finally adjusted to 133 Pa or lower to remove formed phenols out of the system. The reaction time period is normally approximately 1 to 4 hours.

Examples of the carbonate diester include diphenyl carbonate, dinaphthyl carbonate, bis(diphenyl) carbonate, dimethyl carbonate, diethyl carbonate and dibutyl carbonate, and of these, diphenyl carbonate is preferred.

For increasing the polymerization speed, a polymerization catalyst may be used. The polymerization catalyst includes hydroxides of alkali metals or alkaline earth metals such as sodium hydroxide and potassium hydroxide. It also includes hydroxide of boron or aluminum, alkali metal salt, alkaline earth metal salt, quaternary ammonium salt and alkoxide of alkali metal or alkaline earth metal. It also includes an organic acid salt of alkali metal or alkaline earth metal. Further, it also includes catalysts that are normally used in esterification reactions or ester exchange reactions, such as a zinc compound, a boron compound, a silicon compound, a germanium compound, an organotin compound, a lead compound, an antimony compound, a manganese compound, a titanium compound and a zirconium compound. These catalysts may be used singly or in combination of two or more of them. The amount of the polymerization catalyst per mole of the dihydric phenol as a raw material is preferably in the range of $1\times10^{-8}$ to $1\times10^{-3}$ equivalent weight, more preferably in the range of $1\times10^{-7}$ to $1\times10^{-4}$ equivalent weight.

In the polymerization reaction, for decreasing phenolic terminal groups, compounds such as 2-chlorophenylphenyl carbonate, 2-methoxycarbonylphenylphenyl carbonate and 2-ethoxycarbonylphenyl carbonate can be added at a later stage, or after the end, of the polycondensation reaction.

Further, in the melt ester exchange method, it is preferred to use a deactivator that neutralizes the activity of the catalyst. The amount of the above deactivator per mole of a remaining catalyst is preferably 0.5 to 50 moles. Further, the amount thereof based on the aromatic polycarbonate after the polymerization is 0.01 to 500 ppm, more preferably 0.01 to 300 ppm, particularly preferably 0.01 to 100 ppm. The deactivator preferably includes phosphonium salts such as dodecylbenzenesulfonic acid tetrabutylphosphonium salt, and ammonium salts such as tetraethylammonium dodecylbenzenesulfate.

Details of reaction styles other than the above reactions are also well known in technical books and patent publications.

The molecular weight of the polycarbonate resin (component A) is preferably $1.0\times10^4$ to $10.0\times10^4$, more preferably $1.5\times10^4$ to $3.0\times10^4$, still more preferably $1.7\times10^4$ to $2.7\times10^4$, particularly preferably 18,000 to 25,000. When a polycarbonate resin having the above viscosity average molecular weight is used, the resin composition of this invention has sufficient strength and has excellent melt flowability during molding. Such excellent melt flowability is preferred since it makes possible to further decrease a molding strain. In the above range, durability against secondary processing such as hard coating treatment is also sufficient. The above polycarbonate resin may be obtained by mixing polycarbonate resins having viscosity average molecular weights outside the above range.

The viscosity average molecular weight (M) of the polycarbonate resin (component A) is determined by inserting a specific viscosity ($\eta_{sp}$) determined from a solution of 0.7 g of the polycarbonate resin in 100 ml of methylene chloride into the following expression.

$$\eta_{sp}/c=[\eta]+0.45\times[\eta]^2 c \text{(in which } [\eta] \text{ is an intrinsic viscosity.)}$$

$$[\eta]=1.23\times10^{-4}M^{0.83}$$

$$c=0.7$$

The polycarbonate resin (component A) in this invention includes the following embodiments. That is, there can be also used an aromatic polycarbonate which contains an aromatic polycarbonate (PC1) having a viscosity average molecular weight of $7.0\times10^4$ to $30.0\times10^4$ and an aromatic polycarbonate (PC2) having a viscosity average molecular weight of $1.0\times10^4$ to $3.0\times10^4$ and has a viscosity average molecular weight of $1.5\times10^4$ to $4.0\times10^4$, suitably, $2.0\times10^4$ to $3.0\times10^4$ (to be sometimes referred to as "high-molecular-weight-component-containing aromatic polycarbonate" hereinafter).

The above high-molecular-weight-component-containing aromatic polycarbonate increases the entropy elasticity of the polymer due to the presence of PC1 and is advantageous for injection press molding that is suitably used for large-size molded articles. For example, appearance defects such as a hesitation mark can be decreased, and the conditions of the injection press molding can be widened to that extent. On the other hand, a low-molecular-weight component as a PC2 component decreases the melt viscosity of the whole and promotes the relaxation of the resin to enable the molding of an article having a lower strain. In addition, a similar effect is also observed in a polycarbonate resin containing a branched component.

(Ester of Pentaerythritol and Aliphatic Carboxylic Acid: Component B)

The component B used in this invention is an ester (fatty acid ester) of pentaerythritol and an aliphatic carboxylic acid, and characteristically has a critical stress of 12 MPa or more when it is treated at a temperature of 120° C. for 24 hours in a one/fourth ellipse test method using a bisphenol A type polycarbonate resin sheet that is produced by a melt-extrusion method and has a viscosity average molecular weight of 24,500.

The component B can be produced by reacting an aliphatic carboxylic acid with pentaerythritol according to conventionally known various methods. The reaction catalyst includes, for example, sodium hydroxide, potassium hydroxide, barium hydroxide, calcium hydroxide, calcium oxide, barium oxide, magnesium oxide, zinc oxide, sodium carbonate, potassium carbonate and organotin compounds such as 2-ethylhexyl tin.

The fats and fatty oils that constitute the aliphatic carboxylic acid include, for example, animal fats and fatty oils such as beef tallow and lard, and plant oils such as linseed oil, safflower oil, sunflower oil, soybean oil, corn oil, groundnut oil, cottonseed oil, sesame oil and olive oil. Above all, palm oil is widely used owing to the advantage of its production cost.

This invention has been made by having found that the durability against breaking is improved well when the critical stress of the fatty acid ester (component B) becomes the specified value or higher. First, it is considered that the breaking of a molded article is caused by the direct contact of the fatty acid ester remaining on a mold surface with a high-temperature polycarbonate resin having a strain and a stress that remain to a great extent during molding. Secondly, it is considered that the breaking of a molded article is caused although the above breaking did not occur, the polycarbonate resin deteriorated and a situation where the breaking is liable to occur due to a subsequent stimulus.

The critical stress of the fatty acid ester (component B) is 12 MPa or more, more preferably 14 MPa or more, still more preferably 15 MPa or more, further more preferably 16 MPa or more.

The testing of the above critical stress is normally carried out as follows, since the fatty acid ester is a solid having a melting point of 60° C. or higher. That is, the solid of the fatty acid ester is heated to bring it into a molten state, and applied to the entire surface of a predetermined polycarbonate resin sheet set on a tool according to a one fourth ellipse test method. Then, the above sheet is stored in a gear oven at 120° C. for 24 hours to heat-treat it. The thus-treated sheet is cooled, the fatty acid ester on the surface was removed, and then the critical stress of the fatty acid ester is evaluated on the basis of a site where a crack occurs. When the fatty acid ester easily flows away off the sheet surface during the storage in the gear oven since the viscosity at 120° C. is too low, gauze impregnated with the fatty acid ester is placed on the sheet surface to carry out the treatment. Further, when it is already a liquid at room temperature, it is applied to the sheet surface without heating it, or gauze impregnated with such a liquid is placed on the sheet surface to carry out the evaluation. The polycarbonate resin sheet used in the above test method is selected from polycarbonate resin sheets wherein the residual strain is very low. Normally, sheets produced by a melt-extrusion method have a very low remaining residual strain and hence can be used as they are. When they have a large strain, it is required to decrease a residual strain by annealing, etc., before the test. The maximum value of the critical stress measurable with a tool for the one fourth ellipse test shown in FIG. 1 in Examples to be described later is 47 MPa.

The component B is preferably a full ester of pentaerythritol and an aliphatic carboxylic acid. The esterification ratio of the fatty acid ester (component B) is not specially limited, while the esterification ratio is preferably 60% or more, more preferably 80% or more, still more preferably 85% or more. An ester having a low esterification ratio and having a high hydroxyl value fails to satisfy the above critical stress of 12 MPa or more. In this invention, the full ester is not necessarily required to have an esterification ratio of 100%, and the esterification ratio is sufficiently 80% or more, preferably 85% or more.

The reason why the polycarbonate resin composition containing the fatty acid ester (component B) has excellent releasability from a mold, a decreased internal strain in a molded article and improved durability against breaking is not clear, while it is considered as follows.

A fatty acid ester (component B) remaining on a mold surface directly attacks a high-temperature polycarbonate resin to deteriorate it. It is hence considered that the fatty acid ester whose attacking nature is low improves the durability against breaking.

The content of the fatty acid ester (component B) as component B per 100 parts by weight of the polycarbonate resin is 0.005 to 1 part by weight, preferably 0.01 to 0.7 part by weight, more preferably 0.03 to 0.5 part by weight. When the content of the fatty acid ester as component B is outside the above range and is too small, the improvement in releasability from a mold is not sufficient, and the durability against breaking is also decreased. On the other hand, when the content of the fatty acid ester (component B) is outside the above range and is too large, the transparency of a molded article is impaired, and the durability against breaking is sometimes rather decreased due to a decrease in resistance to molding heat.

(Epoxy Compound: Component C)

The epoxy compound (component C) characteristically has a critical stress of 12 MPa or more when it is treated at a temperature of 120° C. for 24 hours in a one/fourth ellipse test method using a bisphenol A type polycarbonate resin sheet that is produced by a melt-extrusion method and has a viscosity average molecular weight of 24,500.

When the polycarbonate resin composition containing the epoxy compound (component C) is used in a transparent member for a vehicle that is exposed in a high-temperature high-humidity environment, the epoxy compound not only imparts the composition with excellent resistance to boiling water but also inhibits the corrosion of a mold of molding machine, and it has excellent durability against the breaking of a molded article. In particular, when it is used in combination with the phosphorus stabilizer (component E), it imparts the composition with excellent resistance to boiling water. The reason why a molded article is improved in durability against breaking is not clear, while it is considered to have an effect similar to that of the above aliphatic fatty acid ester (component B). That is, an epoxy compound (component C) remaining on the mold surface directly attacks a high-temperature polycarbonate resin to deteriorate it. It is hence considered that the epoxy compound whose attacking nature is low improves the durability against breaking.

The epoxy compound (component C) can be selected in principle from all of compounds having an epoxy functional group for the purpose of imparting the composition with excellent resistance to boiling water and the purpose of inhibiting the corrosion of a mold. However, when it is used in a molded article for a transparent member for a vehicle in this invention, it is required to have a critical stress of 12 MPa or more in addition.

Examples of the above epoxy compound (component C) include 3,4-epoxycyclohexylmethyl-3',4'-epoxycyclohexyl carboxylate, a 1,2-epoxy-4-(2-oxiranyl)cyclohexane adduct of 2,2-bis(hydroxymethyl-1-butanol, a copolymer of methyl methacrylate and glycidyl methacrylate, and a copolymer of styrene and glycidyl methacrylate.

The critical stress of the epoxy compound (component C) is 12 MPa or more, preferably 14 MPa or more, more preferably 15 MPa or more, further preferably 16 MPa or more. When the critical stress is measured with a tool according to a one fourth ellipse test method shown in FIG. 1 in Examples to be described later, the maximum value thereof is 47 MPa.

The content of the epoxy compound (component C) per 100 parts by weight of the component A is 0.003 to 0.2 part by weight, preferably 0.004 to 0.15 part by weight, more preferably 0.005 to 0.1 part by weight. When the content of the epoxy compound (component C) is less than 0.003 part by weight, the effect on improvement in resistance to boiling water is not sufficient, and the effect on the inhibition of corrosion of a mold when the resin composition of this invention is molded is not sufficient. When the content of the epoxy compound (component C) exceeds 0.2 part by weight, the heat resistance of the polycarbonate resin is deteriorated, thereby causing a problem that a molded article is colored.

(Ultraviolet Absorbent: Component D)

The ultraviolet absorbent (component D) is not specially limited so long as it can impart a molded article with weatherability, while it is suitably selected from ultraviolet absorbents of benzophenone-, benzotriazole-, hydroxyphenyltriazine- and cycloiminoester-containing compounds.

Specifically, examples of the benzophenone-containing ultraviolet absorbent include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of the benzotriazole-containing ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one), 2-[2-hydroxy-3-(3,4,5,6-tetrahydrophthalimidomethyl)-5-methylphenyl]benzotriazole, and polymers having a 2-hydroxyphenyl-2H-benzotriazole structure such as a copolymer of 2-(2'-hydroxy-5-methacryloxyethylphenyl)-2H-benzotriazole and a vinyl monomer copolymerizable with said monomer, and a copolymer of 2-(2'-hydroxy-5-acryloxyethylphenyl)-2H-benzotriazole and a vinyl monomer copolymerizable with said monomer.

Examples of the hydroxyphenyltriazine-containing ultraviolet absorbent includes 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Further, it includes compounds in which the above phenyl group is 4-dimethylphenyl, such as 2-(4,6-bis(2,4-dimethylphenyl)-1,3,5-triazin-2-yl)-5-hexyloxyphenol.

Examples of the cycloiminoester-containing ultraviolet absorbent include 2,2'-bis(3,1-benzooxazin-4-one), 2,2'-p-phenylenebis(3,1-benzooxazin-4-one), 2,2'-m-phenylenebis(3,1-benzooxazin-4-one), 2,2'-(4,4'-diphenylene)bis(3,1-benzooxazin-4-one), 2,2'-(2,6-naphthalene)bis(3,1-benzooxazin-4-one), 2,2'-(1,5-naphthalene)bis(3,1-benzooxazin-4-one), 2,2'-(2-methyl-p-phenylene)bis(3,1-benzooxazin-4-one), 2,2'-(2-nitro-p-phenylene)bis(3,1-benzooxazin-4-one), and 2,2'-(2-chloro-p-phenylene)bis(3,1-benzooxazin-4-one). Of these, 2,2'-p-phenylenebis(3,1-benzooxazin-4-one), 2,2'-(4,4'-diphenylene)bis(3,1-benzooxazin-4-one) and 2,2'-(2,6-naphthalene)bis(3,1-benzooxazin-4-one) are preferred, and 2,2'-p-phenylenebis(3,1-benzooxazin-4-one) is particularly preferred.

Of the above-described ultraviolet absorbents, the benzotriazole-, hydroxyphenyltriazine- and cycloiminoester-containing compounds are preferred, and the benzotriazole- and cycloiminoester-containing compounds are particularly preferred for headlamp lenses. The above ultraviolet absorbents may be used singly or as a mixture containing two or more of them.

The content of the ultraviolet absorbent (component D) per 100 parts by weight of the component A is 0.01 to 1 part by weight. The above content per 100 parts by weight of the component A is preferably 0.03 to 0.7 part by weight, more preferably 0.05 to 0.4 part by weight, still more preferably 0.08 to 0.35 part by weight, particularly preferably 0.1 to 0.3 part by weight. When the content of the ultraviolet absorbent (component D) per 100 parts by weight of the component A is less than 0.01 part by weight, the weatherability of the intended resin composition is not sufficient. When the content of the ultraviolet absorbent (component D) exceeds 1 part by weight, the ultraviolet absorbent itself is in many cases colored in yellow due to its nature, and colors the polycarbonate resin in yellow, so that it is required to add a large amount of a bluing agent for offsetting the yellow tint thereof. As a result, there is caused a problem that the transparency of a molded article is deteriorated and that the amount of the ultraviolet absorbent that volatilizes during molding increases to contaminate a mold.

(Phosphorus Stabilizer: Component E)

The phosphorus stabilizer can be selected from those which can inhibit the deterioration of a polycarbonate resin during molding and which are already known as stabilizers for a polycarbonate resin. Examples thereof include phosphite-, phosphate- and phosphonite-containing compounds.

The phosphite compound includes triphenyl phosphite, tris(nonylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl) phosphite, tris(di-iso-propylphenyl) phosphite, tris(di-n-butylphenyl) phosphite, tris(2,4-di-tert-butylphenyl) phosphite, tris(2,6-di-tert-butylphenyl) phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenylbisphenol A pentaerythritol diphosphite, bis(nonylphenyl)pentaerythritol diphosphite, and dicyclohexylpentaerythritol diphosphite.

Further, there can be also used other phosphite compounds that react with dihydric phenols and have cyclic structures. Examples thereof include 2,2'-methylenebis(4,6-di-tert-butylphenyl) (2,4-di-tert-butylphenyl) phosphite, 2,2'-methylenebis(4,6-di-tert-butylphenyl) (2-tert-butyl-4-methylphenyl) phosphite, 2,2'-methylenebis(4-methyl-6-tert-butylphenyl) (2-tert-butyl-4-methylphenyl) phosphite, and 2,2'-ethylidenebis(4-methyl-6-tert-butylphenyl) (2-tert-butyl-4-methylphenyl) phosphite.

The phosphate compound includes tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

The phosphonite compound includes tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. In particular, tetrakis(di-tert-butylphenyl)-biphenylene diphosphonite and bis(d-tert-butylphenyl)-phenyl phosphonite are preferred, and tetrakis(2,4-di-tert-butylphenyl)-biphenylene diphosphonite and bis(2,4-di-tert-butylphenyl)-phenyl-phenyl phosphonite are more preferred. The above phosphonite compound can be used, and preferably used, in combination with a phosphonite compound having an aryl group in which two or more of the above alkyl groups are substituted.

Not only one of the phosphorus stabilizers (component E) can be used, but two or more of them can be also used. The phosphite compound or the phosphonite compound is particularly preferred as the phosphorus stabilizers (component E). Especially, tris(2,4-di-tert-butylphenyl) phosphite, tetrakis(2,4-di-tert-butylphenyl)-4,4'-biphenylene diphosphonite and bis(2,4-di-tert-butylphenyl)-phenyl-phenyl phosphonite are preferred.

The content of the phosphorus stabilizer (component E) per 100 parts by weight of the polycarbonate resin (component A) is 0.001 to 0.5 part by weight, preferably 0.003 to 0.3 part by weight, more preferably 0.005 to 0.1 part by weight, still more preferably 0.01 to 0.5 part by weight. When the content of the phosphorus stabilizer (component E) is less than 0.001 part by weight per 100 parts by weight of the component A, the effect on the intended stabilization of the polycarbonate resin is low. When the content of the phosphorus stabilizer (component E) exceeds 0.5 part by weight, the polycarbonate resin may be colored, or the breaking of a molded article may be caused.

(Hindered Phenol-Containing Stabilizer: Component F)

The resin composition of this invention may contain a hindered phenol-containing stabilizer (component F).

The hindered phenol-containing stabilizer (component F) can be selected from antioxidants that are applicable to various resins. Examples thereof include α-tocopherol, butylhydroxytoluene, sinapyl alcohol, vitamin E, n-octadecyl-3-(3,5-di-tert-butyl-4-hydroxyphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylene-bis(4-methyl-6-tert-butylphenol), 2,2'-methylene-bis(4-ethyl-6-tert-butylphenol), 4,4'-methylene-bis(2,6-di-tert-butylphenol), 2,2'-methylene-bis(4-methyl-6-cyclohexylphenol), 2,2'-methylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexandediol-bis[3-(3,5-di-tert-butyl-4-hydroxyphenyl)propionate, bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl)propionyloxy]ethyl isocyanurate, and tetrakis[methylene-3-(3',5'-di-tert-butyl-4-hydroxyphenyl)propionate]methane. Any one of these is easily available. The above hindered phenol-containing stabilizers may be used singly or in combination of two or more of them.

The content of the hindered phenol-containing stabilizer (component F) per 100 parts by weight of the polycarbonate resin (component A) is 0.001 to 0.5 part by weight. The above content per 100 parts by weight of the component A is 0.01 to 0.3 part by weight, more preferably 0.02 to 0.1 part by weight. When the content of the hindered phenol-containing stabilizer (component F) per 100 parts by weight of the component A is in the above range, the effect on the stabilization of the polycarbonate resin is sufficient, and the possibility of coloring the polycarbonate resin and causing the breaking of a molded article is decreased.

(Light Stabilizer)

The resin composition of this invention can contain a light stabilizer typified by bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly{[6-(1,1,3,3-tetramethylbutyl)amino-1,3,5-triazin-2,4-diyl][2,2,6,6-tetramethylpiperidyl]imino}hexamethylene[(2,2,6,6-tetramethylpiperidyl)imino]hexamethylene[(2,2,6,6-tetramethylpiperidyl)imino]}, and polymethylpropyl-3-oxy-[4-(2,2,6,6-tetramethyl)piperidyl]siloxane. Further, the use of the hindered amine-containing light stabilizer in combination with the benzotriazole- and/or triazine-containing ultraviolet absorbent effectively improves the weatherability. In the above combined use, the weight ratio of the above two components (light stabilizer/ultraviolet absorbent) is preferably in the range of 95/5-5/95, more preferably in the range of 80/20-20/80.

The light stabilizers may be used singly or as a mixture of two or more of them. The content of the light stabilizer per 100 parts by weight of the polycarbonate resin (component A) is preferably 0.0005 to 3 parts by weight, more preferably 0.01 to 2 parts by weight, still more preferably 0.02 to 1 part by weight, particularly preferably 0.05 to 0.5 part by weight.

(Bluing Agent)

Preferably, the resin composition of this invention further contains 0.05 to 3 ppm (weight ratio) of a bluing gent. The bluing agent is effective for killing the yellow tint of a polycarbonate resin molded article. In particular, the reality is that a resin molded article is liable to have the yellow tint due to "the activity and color of an ultraviolet absorbent" since the ultraviolet absorbent is contained, and the use of the bluing agent is very effective for imparting the molded article with the natural sense of transparency.

The above bluing agent refers to a colorant that absorbs orange to yellow light to show a blue to violet color, and in particular, a dye is preferable. When the bluing agent is incorporated, the resin composition of this invention achieves a further excellent hue. The important point here is the content of the bluing agent. When the content of the bluing agent in the resin composition is less than 0.05 ppm, the effect on improvement in hue is sometimes insufficient. When it exceeds 3 ppm, improperly, the light transmittance is decreased. The content of the bluing agent in the resin composition is more preferably in the range of 0.2 to 2.5 ppm, still more preferably in the range of 0.3 to 2 ppm.

Typical examples of the bluing agent include MACROLEX Violet B and MACROLEX Blue RR supplied by Bayer Chemicals Japan K.K. and POLYSYNTHLEN Blue RLS supplied by Clariant (Japan) K.K.

(Dye and Pigment)

The resin composition of this invention can contain various dyes and pigments in addition to the above bluing agent so long as the object of this invention is not impaired. In particular, dyes are preferred from the viewpoint of the maintenance of transparency. The dyes preferably include a perylene dye, a coumarin dye, a thioindigo dye, an anthraquinone dye, a thioxanthone dye, ferrocyanides such as an ultramarine blue pigment, a perinone dye, a quinoline dye, a quinacridone dye, a dioxazine dye, an isoindolinone dye and a phthalocyanine dye. Further, there can be used fluorescent whiteners such as a bisbenzooxazolyl-stilbene derivative, a bisbenzooxazolyl-naphthalene derivative, a bisbenzooxazolyl-thiophene derivative and a coumarin derivative. The amount of the above dye and fluorescent whitener for use per 100 parts by weight of the polycarbonate resin (component A) is preferably 0.0001 to 1 part by weight, more preferably 0.0005 to 0.5 part by weight.

(Antistatic Agent)

The resin composition of this invention is sometimes required to have antistatic performances, and in such a case, it preferably contains an antistatic agent. Examples of the antistatic agent include (i) arylsulfonic acid phosphonium salts typified by dodecylbenzenesulfonic acid phosphonium salt, and organic sulfonic acid phosphonium salts such as alkylsulfonic acid phosphonium salt. The amount ratio of the above phosphonium salt per 100 parts by weight of the polycarbonate resin (component A) is properly 5 parts by weight or less, preferably 0.05 to 5 parts by weight, more preferably 1 to 3.5 parts by weight, still more preferably in the range of 1.5 to 3 parts by weight.

Examples of the antistatic agent include (ii) organic sulfonic acid alkali (alkaline earth) metal salts such as lithium organic sulfonate, sodium organic sulfonate, potassium organic sulfonate, cesium organic sulfonate, rubidium organic sulfonate, calcium organic sulfonate, magnesium organic sulfonate and barium organic sulfonate. Specifically, examples thereof include metal salts of dodecylbenzenesulfonic acid and metal salts of perfluoroalkanesulfonic acid. The amount ratio of the organic sulfonic acid alkali (alkaline earth) metal salt per 100 parts by weight of the polycarbonate resin (component A) is properly 0.5 part by weight or less, preferably 0.001 to 0.3 part by weight, more preferably 0.005 to 0.2 part by weight. In particular, salts of alkali metals such as potassium, cesium and rubidium are preferred.

Examples of the antistatic agent include (iii) organic sulfonic acid ammonium salts such as alkylsulfonic acid ammonium salt and arylsulfonic acid ammonium salt. The amount ratio of the above ammonium salt per 100 parts by weight of the polycarbonate resin (component A) is 0.05 part by weight or less. Examples of the antistatic agent include (iv) glycerin derivative esters such as glycerin monostearate, maleic anhydride monoglyceride and maleic anhydride diglyceride. The amount ratio of the above ester per 100 parts by weight of the component A is properly 0.5 part by weight or less. Examples of the antioxidant include (v) polymers containing a poly(oxyalkylene)glycol component as a constituent component, such as polyether ester amide. The amount ratio of the above polymer per 100 parts by weight of the component A is properly 5 parts by weight or less. Examples of other antioxidant include (vi) non-organic compounds such as carbon black, carbon fibers, carbon nanotubes, graphite, metal powders and metal oxide powders. The amount ratio of the above non-organic compound per 100 parts by weight of the component A is properly 0.5 part by weight or less. These non-organic compounds described as examples in (vi) are sometimes incorporated as heat-absorbing agents besides the antistatic agent.

(Compound Having Heat-Absorbing Capability)

The resin composition of this invention may contain a compound having heat-absorbing capability within an amount that the object of this invention is not impaired. Examples of said compounds include phthalocyanine-containing near infrared absorbents, metal-oxide-containing near infrared absorbents such as ATO, ITO, iridium oxide, and ruthenium oxide, various metal compounds excellent in near infrared-absorbing capability including metal-boride-containing near infrared absorbents such as lanthanum boride, cerium boride and tungsten boride, and carbon filler. Further, metallic pigments (e.g., a plate-shaped filler coated with a meal oxide, a plate-shaped filler coated with a metal and metal flakes) mainly reflect heat and exhibit heat shielding capability. As the above phthalocyanine-containing near infrared absorbent, for example, MIR-362 supplied by Mitsui Chemical Corporation is commercially easily available. Examples of the carbon filler include carbon black, graphite (including natural and synthetic ones, and further including whisker), carbon fibers (including a product according to a gas phase growth method), carbon nanotubes and fullerene, and carbon black and graphite are preferred. These may be used singly or in combination of two or more of them.

The amount of the phthalocyanine-containing near infrared absorbent per 100 parts by weight of the polycarbonate resin (component A) is preferably 0.0005 to 0.2 part by weight, more preferably 0.0008 to 0.1 part by weight, more preferably 0.001 to 0.07 part by weight. The amount of the metal-oxide-containing near infrared absorbent and the metal-boride-containing near infrared absorbent based on the component A is preferably in the range of 0.1 to 200 ppm (weight ratio), more preferably in the range of 0.5 to 100 ppm. The amount of the carbon filler based on the component A is preferably in the range of 0.05 to 5 ppm (weight ratio). The amount of the metallic pigment per 100 parts by weight of the component A is preferably 0.0001 to 1 part by weight, more preferably 0.0005 to 0.8 part by weight.

(Flame Retardant)

The Resin Composition of this Invention Contains such an amount of a flame retardant that does not impair the object of this invention. The flame retardant includes a polycarbonate type flame retardant of halogenated bisphenol A, an organic-salt-containing flame retardant, an aromatic-phosphoric-ester-containing flame retardant and a halogenated-aromatic-phosphoric-ester-containing flame retardant, and one or more of these can be used.

The polycarbonate type flame retardant of halogenated bisphenol A includes a polycarbonate type flame retardant of tetrabromobisphenol A and a copolycarbonate type flame retardant of tetrabromobisphenol A and bisphenol A.

The organic-salt-containing flame retardant includes potassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-dibromo-4-cumylphenyl)phosphate, sodium bis(4-cumylphenyl)phosphate, potassium bis(p-toluenesulfone)imide, potassium bis(biphenylphosphoric acid) imide, potassium bis(2,4,6-tribromophenyl)phosphate, potassium bis(2,4-dibromophenyl)phosphate, potassium bis (4-bromophenyl)phosphate, potassium diphenylphosphate, sodium diphenylphosphate, potassium perfluorobutanesulfonate, sodium or potassium laurylsulfate, and sodium or potassium hexadecylsulfate.

The halogenated-aromatic-phosphoric-ester-containing flame retardant includes tris(2,4,6-tribromophenyl)phosphate, tris(2,4-dibromophenyl)phosphate and tris(4-bromophenyl)phosphate.

The aromatic-phosphoric-ester-containing flame retardant includes triphenyl phosphate, tris(2,6-xylyl)phosphate, tetrakis(2,6-xylyl)resorcin diphosphate, tetrakis(2,6-xylyl)hydroquinone diphosphate, tetrakis(2,6-xylyl)-4,4'-biphenyl diphosphate, tetraphenylresorcin diphosphate, tetraphenylhydroquinone diphosphate, tetraphenyl-4,4'-biphenol diphosphate, aromatic polyphosphate whose aromatic ring source is of resorcin and phenol and which contains no phenolic OH group, aromatic polyphosphate whose aromatic ring source is of resorcin and phenol and which contains a phenolic OH group, aromatic polyphosphate whose aromatic ring source is of hydroquinone and phenol and which contains no phenolic OH group, similar aromatic polyphosphate containing a phenolic OH group ("aromatic polyphosphate" hereinafter shall stand for an aromatic polyphosphate containing a phenolic OH group and an aromatic polyphosphate containing no phenolic OH group), aromatic polyphosphate whose aromatic ring source is of bisphenol A and phenol, aromatic polyphosphate whose aromatic ring source is of tetrabromobisphenol A and phenol, aromatic polyphosphate whose aromatic ring source is of resorcin and 2,6-xylenol, aromatic polyphosphate whose aromatic ring source is of hydroquinone and 2,6-xylenol, aromatic polyphosphate whose aromatic ring source is of bisphenol A and 2,6-xylenol, and aromatic polyphosphate whose aromatic ring source is of tetrabromobisphenol A and 2,6-xylenol.

(Other Resins and Elastomers)

The resin composition of this invention may contain other resin and elastomer according to purposes.

Examples of the above resin include polyester resins such as polyethylene terephthalate and polybutylene terephthalate, a polyamide resin, a polyimide resin, a polyetherimide resin, a polyurethane resin, a silicone resin, a polyphenylene ether resin, a polyphenylene sulfide resin, a polysulfone resin, polyolefin resins such as polyethylene and polypropylene, a polystyrene resin, an acrylonitrile/styrene copolymer (AS resin), an acrylonitrile/butadiene/styrene copolymer (ABS resin), a polymethacrylate resin, a phenolic resin and an epoxy resin.

Examples of the elastomer include isobutylene/isoprene rubber, styrene/butadiene rubber, ethylene/propylene rubber, an acrylic elastomer, a polyester-based elastomer, a polyamide-based elastomer, MBS (methyl methacrylate/styrene/butadiene) rubber that is a core-shell type elastomer, and MAS (methyl methacrylate/acrylonitrile/styrene) rubber.

The resin composition of this invention may contain various inorganic fillers, a fluidity modifier, an anti-fungus agent, a photocatalyst-based stain-proofing agent, an infrared absorbent and a photochromic agent according to purposes.

(Surface Treatment)

The molded article from the resin composition of this invention can be surface-treated in various ways. For the surface treatment, there can be carried out various surface treatments of hard coating, water-repellent/oil-repellent coating, hydrophilic nature-imparting coating, antistatic coating, ultraviolet absorption coating and metallizing (vapor deposition). The surface treatment method includes coating with a liquid and the other methods such as a vapor deposition method, a spraying method and a plating method. As the vapor deposition method, any one of a physical vapor deposition method and a chemical vapor deposition method can be used. Examples of the physical vapor deposition method include vacuum vapor deposition, sputtering and ion plating. Examples of the chemical vapor deposition (CVD) method include a thermal CVD method, a plasma CVD method and an optical CVD method.

Being improved in the durability against breaking, the molded article of this invention is suitable for carrying out the above surface treatments. The resin composition of this invention is especially suitable for surface treatment including a factor that causes a detrimental effect on a polycarbonate resin such as a solvent, and in particular suitable for hard coating.

Examples of the hard-coating agent for use in this invention include a silicone-resin-containing hard coating agent and an organic-resin-containing hard coating agent. The silicone-resin-containing hard coating agent forms a cured resin layer having siloxane bonds. The silicone-resin-containing hard coating agent includes a partial hydrolysis condensate composed mainly of a compound corresponding to a trifunctional siloxane unit (such as trialkoxysilane compound), preferably, a partial hydrolysis condensate containing a compound corresponding to a tetrafunctional siloxane unit (such as tetraalkoxysilane compound), and a partial hydrolysis condensate obtained by further filling metal oxide fine particles such as colloidal silica in the above condensate. The silicone-resin-containing hard coating agent may further contain a difunctional siloxane unit and a monofunctional siloxane unit. These include an alcohol generated during the condensation reaction (when the agent is a partial hydrolysis condensate of an alkoxysilane), and the silicone-resin-containing hard coating agent may be dissolved or dispersed in an organic solvent, water or a mixture of these as required. The organic solvent therefor includes lower aliphatic alcohols, polyhydric alcohols and ethers or esters thereof. The hard coating layer may contain various surfactants for achieving a smooth surface state, such as siloxane- and alkyl-fluoride-containing surfactants.

Examples of the organic hard coating agent include a melamine resin, a urethane resin, an alkyd resin, an acrylic resin and a polyfunctional acrylic resin. The above polyfunctional acrylic resin includes polyol acrylate, polyester acrylate, urethane acrylate, epoxy acrylate and phosphazene acrylate.

Of these hard coating agents, a silicone-resin-containing hard coating agent having excellent long-term durability and relatively high surface hardness or an ultraviolet cured type acrylic resin or polyfunctional acrylic resin which are relatively easy to process and form an excellent hard coating layer are preferred. The silicone-resin-containing hard coating agent can be any one of a two-coat type composed of a primer layer and a top layer and a one-coat type composed of a single layer alone.

The resin for constituting the above primer layer (first layer) includes various urethane resins each consisting of a block isocyanate component and a polyol component, an acrylic resin, a polyester resin, an epoxy resin, a melamine resin, an amino resin, and various polyfunctional acrylic resins such as polyester acrylate, urethane acrylate, epoxy acrylate, phosphazene acrylate, melamine acrylate and amino acrylate. These can be used singly or in combination of two or more of them. Of these, a resin containing an acrylic resin or polyfunctional acrylic resin content of 50% by weight or more, more preferably 60% by weight or more, is preferred, and in particular, a resin containing an acrylic resin and urethane acrylate is preferred. For these resins, there can be employed any one of a method in which a resin in an unreacted state is applied and then a predetermined reaction is carried out to form a cured resin and a method in which a reacted resin is directly applied to form a cured resin layer. In the latter method, the resin is dissolved in a solvent to prepare a solution and the solution is applied followed by the removal of the solvent. In the former, generally, a solvent is used.

The resin for constituting the hard coating layer may contain the above light stabilizer and ultraviolet absorbent, and may contain a catalyst, a thermal/photopolymerization initiator, a polymerization inhibitor, a silicone antifoaming agent, a leveling agent, a thickener, a suspending agent, an anti-sagging agent, a flame retardant, various additives of organic/inorganic pigments, dyes and auxiliary agents thereof.

The coating method can be selected from a bar coating method, a dip coating method, a flow coating method, a spray coating method, a spin coating method or a roller coating method as required depending upon the form of a molded article that is a base material to be coated. Of these, a dip coating method, a flow coating method and a spray coating method which are easily suitable for a complicated form of the molded article are preferred.

(Method for Producing Resin Composition)

For producing the resin composition of this invention, any method can be employed. For example, there is a method in which the component A, component B, component C, component D, component E and other optional additives are fully mixed with a preliminary mixing means such as a V blender, a Henschel mixer, a mechano-chemical apparatus or an extrusion mixer, the resultant mixture is then granulated with an extrusion granulator or a briquetting machine as required, and then the mixture is melt-kneaded with a melt-kneader typified by a vented twin-screw extruder and pelletized with an apparatus such as a pelletizer.

There can be also employed a method in which each component is independently fed to a melt kneader typified by a vented twin-screw extruder or a method in which preliminary mixture of some of the components is prepared and then fed to a melt kneader independently of the remaining component(s). The method of preparing the preliminary mixture of some of the components includes, for example, a method in which the fatty acid ester (component B), the epoxy compound (component C), the ultraviolet absorbent (component D), the phosphorus stabilizer (component E) and the hindered-phenol-containing stabilizer (component F) are mixed to prepare a preliminary mixture and then the preliminary mixture is mixed with the polycarbonate resin (component A) or directly fed to an extruder.

When the component A having the form of a powder is included, the method of mixing them to prepare a preliminary mixture includes, for example, a method in which part of the above powder is blended with additives to be added, to prepare a master batch of the additives diluted with the powder. Further, there can be also employed a method in which one component is independently fed somewhere halfway in a melt extruder. When some component to be added has the form of a liquid, there can be used a liquid-injection device or a liquid-adding device for feeding it to a melt extruder.

As an extruder, there is preferably used an extruder having a vent through which water in raw materials and volatile gas generated from a molten kneaded resin can be removed as gases. It is preferred to provide a vacuum pump for efficiently discharging generated water and volatile gas from the vent. Further, a device for feeding a liquid such as water may be provided before the vent for efficiently removing an unnecessary volatile component in the polycarbonate resin. The amount of the above liquid that is injected is preferably 0.1 to 3 parts by weight per 100 parts by weight of the polycarbonate resin (component A). A foreign matter included in the raw materials to be extruded can be removed from the resin composition by providing a screen for removing such a foreign matter in a zone before the die portion of an extruder. The above screen includes metal gauze, a screen changer and a sintered metal plate (disc filter).

The melt kneader includes a twin-screw extruder, and besides this, includes a Banbury mixer, a kneading roll, a single-screw extruder and a multi-screw extruder having three or more screws.

The thus-extruded resin is directly cut to prepare pellets, or formed into strands and the strands are pelletized with a pelletizer to prepare pellets. When it is required to decrease influences caused by external dust, etc., during the pelletization, it is preferred to clean the atmosphere around the extruder.

A molded article can be obtained by injection-molding pellets formed of the resin composition of this invention. The injection molding includes not only a normal molding method but also injection compression molding, injection press molding, gas-assisted injection molding, insert molding, in-mold coating molding, insulated runner molding, rapid heating cooling molding, two-color molding, sandwich molding and ultrahigh speed injection molding. For the molding, any one of a cold rubber system and a hot runner system can be selected.

The resin composition of this invention can be used in the form of various contour extrusion molded articles, a sheet or a film by extrusion molding. For forming a sheet or a film, there can be also used an inflation method, a calender method and a casting method. Further, it can be formed into a heat-shrinkable tube by applying a specific stretching operation.

Further, the resin composition of this invention can be also formed into a hollow molded article by rotational molding or blow molding.

The resin composition of this invention has excellent mold releasability, a reduced internal strain in a molded article, improved durability against breaking and an excellent effect on the inhibition of corrosion of a mold, in addition of excellent transparency, weatherability, resistance to boiling water and resistance to molding heat, so that it is suitably used for various transparent members that are required to have various high qualities.

Examples of the above transparent member include various transparent members for a vehicle (headlamp lens, turn signal lamp lens, tail lamp lens, rear lamp lens, resin window glass and meter cover), a lightening lamp cover, a resin window glass (for construction), a solar cell cover or solar cell substrate, a lens for a display, a touch panel, and parts for a game machine (Japanese pinball machine (pachinko)) (front cover, a circuit cover, a chassis and a ball carrier guide). Out of these, the resin composition of this invention is in particularly suitably used for a molded article to be treated hard coating.

That is, according to this invention, there is provided a molded article formed from a resin composition containing the above-described amounts of the component A, component B, component C, component D and component E and preferably a molded article having its surface treated with a hard coating.

More preferred is a transparent member for a vehicle, which is required to have a high quality as described above and has a large size, and in particular, a headlamp lens, more specifically, a transparent headlamp lens is preferred. The above transparent headlamp lens includes a lamp cover that performs light-collecting activity with a reflector, a lamp unit cover integrally having a lamp unit, and similar products of these kinds.

This invention includes a method of inhibiting a strain in a molded article when a resin composition is injection-molded to produce the molded article, wherein a resin composition comprises 100 parts by weight of a polycarbonate resin (component A), 0.005 to 1 part by weight of an ester (component B) of pentaerythritol and an aliphatic carboxylic acid, 0.003 to 0.2 part by weight of an epoxy compound (component C), 0.01 to 1 part by weight of an ultraviolet absorbent (component D), and 0.001 to 0.5 part by weight of a phosphorus stabilizer (component E), each of the components B and the component C has a critical stress of 12 MPa or more when they are treated at a temperature of 120° C. for 24 hours in a one/fourth ellipse test method using a bisphenol A type polycarbonate resin sheet that is produced by a melt-extrusion method and has a viscosity average molecular weight of 24,500.

This invention includes a method of inhibiting the breaking of a molded article when a resin composition is injection-molded to produce the molded article, wherein the above resin composition is used. The molded article is preferably a transparent member for a vehicle.

EXAMPLES

This invention will be explained hereinafter with reference to Examples, while this invention shall not be limited to these Examples. Evaluations were made according to the following methods.

(1) Critical Stress of Fatty Acid Ester (Component B) and Epoxy Compound (Component C)

They were measured for critical stresses by setting them on a one fourth ellipse testing tool shown in FIG. 1. As a test piece, there was used a test piece having a size of a length of 120 mm and a width of 40 mm which was carefully cut out with a cutter knife from a polycarbonate resin sheet (flexural modulus Eb=2,040 MPa) having a viscosity average molecular weight of 24,500 and a thickness of 1 mm produced by extrusion molding with a T-die. The above polycarbonate resin sheet (indicated by 7) was attached to the tool and fixed thereto along a curved surface of an ellipse with pressing holders (indicated by 5), and each of a fatty acid ester (component B) and an epoxy compound (component C) which were melted in advance was applied to the sheet surface separately. Then, the tool was held in a gear oven at 120° C. for 24 hours, and a horizontal distance X (cm) from a portion (indicated by 8) where a crack occurred due to a smallest strain to the center (indicated by 1) of the ellipse (that is, a horizontal distance indicated by 6 from the minor axis of the ellipse to the point of crack occurrence) was measured. In the tool used in the test, the distance X and the strain $\epsilon$ of the polycarbonate resin sheet have the following relationship.

$$\epsilon=0.02\times(1-0.0084X^2)^{-3/2}t$$

t: thickness (cm) of polycarbonate resin sheet.

X: horizontal distance (cm) from the center of the ellipse to a portion where a crack occurred due to the smallest strain.

In the test of this invention, since t=0.1, the strain $\epsilon$ was determined on the basis of the following expression.

$$\epsilon=2\times(1-0.0084X^2)^{-3/2}\times10^{-3}$$

Further, the critical stress of the crack occurrence was determined from the above value $\epsilon$ on the basis of the following expression.

$$\text{Critical stress (MPa)}=\epsilon\times Eb$$

Eb: Flexural modulus (MPa) of the polycarbonate resin sheet.

(2) Transparency

A molded plate (length 90 mm×width 50 mm×thickness 2 mm) obtained by molding with an injection molding machine having a maximum clamping force of 85 ton at a cylinder temperature of 350° C. and a mold temperature of 80° C. for a molding cycle of 60 seconds was measured for a haze according to ISO14782 with NDH-2000 supplied by Nippon Denshoku Industries Co., Ltd.

With an increase in haze value, it shows larger light diffusion and inferior transparency.

(3) Weatherability

A molded plate (length 90 mm×width 50 mm×thickness 2 mm) obtained by molding with an injection molding machine having a maximum clamping force of 85 ton at a cylinder temperature of 350° C. and a mold temperature of 80° C. for a molding cycle of 60 seconds was treated with a sunshine weatherometer (WEL-SUN:HC-B, supplied by Suga Test Instruments Co., Ltd.) under conditions including a black panel temperature of 63° C., a humidity of 50% and a total 120 minutes' cycle consisting of water spraying for 18 minutes and no water spraying for 102 minutes for 1,000 hours. A color hue change ($\Delta$YI) caused by the treatment was determined from X, Y and Z values obtained by measuring transmitted light with SE-2000 supplied by Nippon Denshoku Industries Co., Ltd., on the basis ASTM-E1925 using the following expression.

With an increase in $\Delta$YI, it shows poorer weatherability.

$$YI=[100(1.28X-1.06Z)]/Y$$

$\Delta$YI=YI of molded plate after treatment–YI of molded plate before treatment (4) Resistance to Boiling Water A molded plate (length 90 mm×width 50 mm×thickness 2 mm) obtained by molding with an injection molding machine having a maximum clamping force of 85 ton at a cylinder temperature of 350° C. and a mold temperature of 80° C. for a molding cycle of 60 seconds was treated in an autoclave SN510 supplied by Yamato Scientific Co., Ltd. under condition including a temperature of 120° C. and a humidity of 100% for 48 hours. Haze values before and after the treatment were measured with NDH-2000 supplied by Nippon Denshoku Industries Co., Ltd., according to ISO-14782, to determine a haze change ($\Delta$Haze) caused by the treatment on the basis of the following expression. With an increase in $\Delta$Haze, it shows that the molded plate is poorer in resistance to boiling water.

$\Delta$Haze=Haze of molded plate after the treatment–Haze of molded plate before the treatment (5) Resistance to Molding Heat A "molded plate before residence" (length 90 mm×width 50 mm×thickness 2 mm) was obtained by molding with an injection molding machine having a maximum clamping force of 85 ton at a cylinder temperature of 350° C. and a mold temperature of 80° C. for a molding cycle of 60 seconds. Further, a "molded plate after residence" (length 90 mm×width 50 mm×thickness 2 mm) was obtained by molding after a resin was caused to reside in the cylinder of the above injection molding machine for 10 minutes. The above plates before and after residence were measured for a color hue (L, a, b) by a C light source reflection method with SE-2000 supplied by Nippon Denshoku Industries Co., Ltd., and a color difference $\Delta$E was determined on the basis of the following expression. With an increase in $\Delta$E, it shows the plate is inferior in resistance to molding heat.

$$\Delta E=\{(L-L')^2+(a-a')^2+(b-b')^2\}^{1/2}$$

Color hue of "molded plate before residence": L, a, b

Color hue of "molded plate after residence": L', a', b'

(6) Releasability from Mold

When a cup-shaped molded article having a size of 70 mm$\phi$×20 mm and a thickness of 4 mm was produced with an injection molding machine having a maximum clamping force of 75 ton under conditions including a cylinder temperature of 300° C., a mold temperature of 80° C. and an injection pressure of 118 MPa, an ejection pin was measured for an ejection load. An average of loads of 30 shots' molding is shown as a load for releasability from a mold. With an increase in load for releasability from a mold, it shows poorer releasability from a mold.

(7) Stress-Induced Breaking Test (7-1) Breaking During Molding

Cup-shaped articles were continuously molded 1,000 shots under the same conditions as those in the above Releasability from mold, and a case where a breaking occurred immediately after molding was taken as x, a case where no breaking was taken as o.

(7-2) Breaking after Hard Coating Treatment

100 Cup-shaped molded articles that did not undergo breaking in the above (7-1) molding were used, and they were subjected to hard coating treatment with a hard-coating agent shown in Examples. A case where molded article(s) had breaking was taken as x, and a case where molded article had no breaking was taken as o.

(8) Strain in Molded Article

Figure 2:
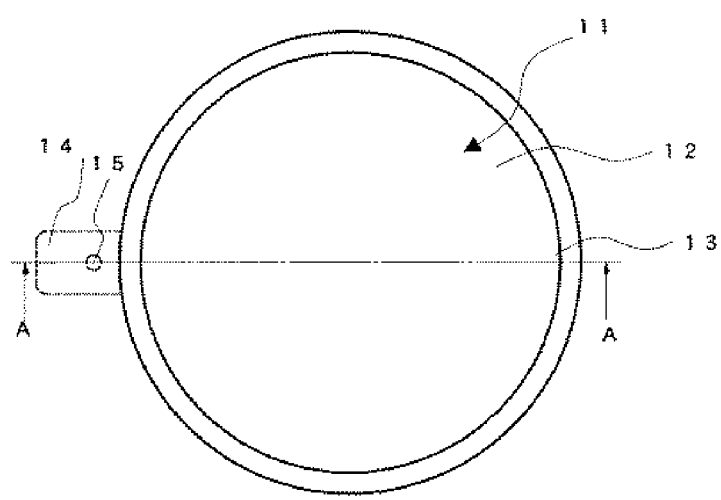
FIG. 2 shows a molded article of a transparent headlamp lens for a vehicle, molded in Example. As is illustrated, the lens has a dome-like form. [2-A] is a front view (Figure projected to a platen surface during molding. Such an area is hence the largest projection area), and [2-B] shows a cross-sectional view taken along A-A line.
Figure 2:
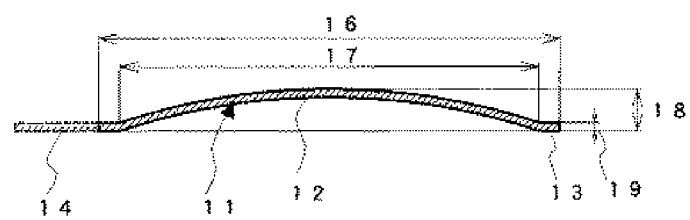

Transparent headlamp lenses shown in FIG. 2 were molded 30 shots with an injection molding machine (SG260M-HP, supplied by Sumitomo Heavy Industries, Ltd.) under conditions including a cylinder temperature of 320° C. and a mold temperature of 80° C., and they were annealed at 120° C. for 2 hours. Then, each of such molded articles was placed between two polarizing plates having planes of polarization at right angles, and it was observed for a shadow (strain-2). Thirty molded articles were observed, and the degree of the shadow was evaluated on the basis of the following ratings.

○: The shadow is relatively weak in contrast and slightly observable.

Δ: The shadow is strong to some extent in contrast and clearly observable.

x: The shadow is strong and very clearly observable over a large area.

(9) Corrosiveness of Mold

Figure 3:
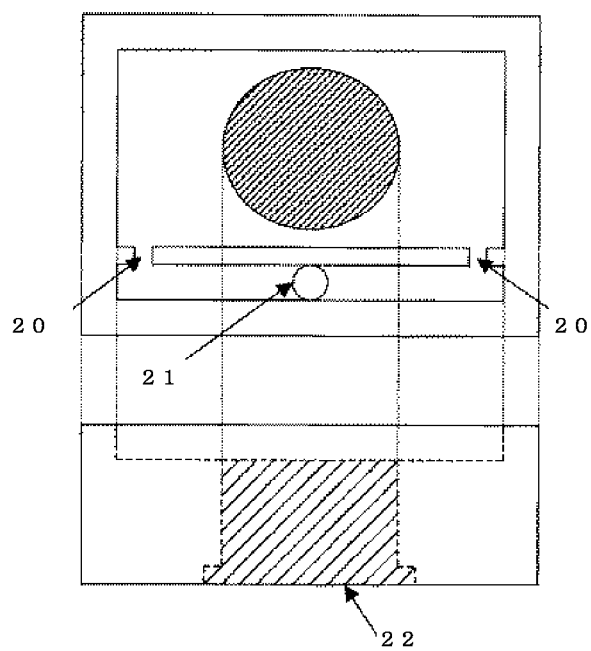
FIG. 3 shows a schematic diagram of a mold used for the evaluation of corrosiveness of a metal (cavity size length 42 mm×width 24 mm×depth 3 mmt, an insert (20 mmφ) made from a mold steel material NAK80 for the evaluation of corrosion is inserted).

Molding was continuously carried out 500 shots with an injection molding machine having a maximum clamping force of 85 ton using a mold having a form shown in FIG. 3 (cavity size length 42 mm×width 24 mm×depth 3 mm, in which an insert (20 mmφ) made from a mold steel material NAK80 for corrosiveness evaluation was inserted), then, the insert for corrosiveness evaluation was taken out of the mold, the mold was placed in a constant-temperature and constant-humidity chamber set at 50° C.×90% RH for 2 hours, and then the appearance thereof was visually observed to determine whether or not the mirror surface of the mold was corroded. Ratings for the determination are as follows.

○: The corrosion accounts for 5% or less of the mirror surface area.

Δ: The corrosion of over 5% but 50% or less of the mirror surface area is observed.

x: The corrosion of over 50% of the mirror surface area is observed.

Examples 1 to 16 and Comparative Examples 1 to 6

Various additives shown in Table 1 in amounts shown in Table 1 were added to 100 parts by weight of a polycarbonate resin produced from bisphenol A and phosgene by an interfacial polycondensation method, and they were blended by means of a blender. Then, the blend was melt-kneaded with a vented twin-screw extruder to obtain pellets. As the vented twin-screw extruder, TEX30α (full intermeshing, rotations in the same direction, double threaded screws) supplied by Japan Steel Works, Ltd. was used. The extruder was of a type having one kneading zone before a vent hole. Extrusion conditions included an output amount of 30 kg/h, a screw speed of 300 rpm and a vent vacuum degree of 2 kPa, and the extrusion temperature was set at 270° C. from a first feed port to a die portion.

The obtained pellets were dried at 120° C. in a hot air circulated dryer for 5 hours, and then they were molded into plates each having a length of 90 mm, a width of 50 mm and a thickness of 2 mm by using of the above injection-molding machine under conditions including a cylinder temperature of 350° C. and a mold temperature of 80° C. As the injection-molding machine, J85ELII supplied by Japan Steel Works, Ltd. was used. Table 1 shows the evaluation results of the thus-obtained molded plates.

Further, pellets obtained in each Example were dried in the same manner as above and molded into transparent headlamp lenses shown in FIG. 2 with an injection-molding machine (SG260M-HP, supplied by Sumitomo Heavy Industries, Ltd.) under conditions including a cylinder temperature of 320° C. and a mold temperature of 80° C. Table 1 shows the evaluation results of strains of the thus-obtained headlamp lenses (strain-2).

Further, the headlamp lenses in Examples 1 to 16 were annealed at 120° C. for 2 hours (after the evaluation in the above (8) was completed), the following acrylic resin coating composition (i-1) was applied to both the surfaces of each headlamp lens by a dip coating method such that they had a coating film thickness of 6.0 μm after the thermal curing of the applied composition, and the coated headlamp lenses were left at 25° C. for 20 minutes, followed by thermal curing at 130° C. for 1 hour. Then, the following organosiloxane coating composition (ii-1) was applied to the coating film surface of each of the above lens molded articles such that they had a coating film thickness of 4.0 μm after the thermal curing of the applied composition, and they were left at 25° C. for 20 minutes, followed by thermal curing at 120° C. for 1 hour to carry out hard coating treatment. When the thus-obtained headlamp lenses were observed, they had no breaking.

(Component A)

A-1: A polycarbonate resin powder having a viscosity average molecular weight of 19,700, produced from bisphenol A and phosgene by an interfacial polycondensation method.

A-2: A polycarbonate resin powder having a viscosity average molecular weight of 22,400, produced from bisphenol A and phosgene by an interfacial polycondensation method.

(Component B)

B-1: An ester of pentaerythritol and aliphatic carboxylic acid (composed mainly of stearic acid and palmitic acid), having a critical stress of 18 MPa according to the above evaluation method (RIKESTER EW-400, supplied by Riken Vitamin Co., Ltd., the aliphatic carboxylic acid was from plant oil and fats as raw materials).

(Fatty Acid Ester Other than the Component B)

B-2: Glycerin monofatty acid ester having a critical stress of 11 MPa according to the above evaluation method (RIKEMAL S-100A, supplied by Riken Vitamin Co., Ltd.).

(Component C)

C-1: A copolymer of styrene and glycidyl methacrylate, having a critical stress of 47 MPa according to the above evaluation method (MARPROOF G-0250SP, supplied by NOF Corporation).

C-2: A copolymer of methyl methacrylate and glycidyl methacrylate, having a critical stress of 47 MPa according to the above evaluation method (MARPROOF G-0150SP, supplied by NOF Corporation).

C-3: 3,4-epoxycyclohexylmethyl-3',4'-epoxycyclohexyl carboxylate having a critical stress of 47 MPa according to the above evaluation method.

(Epoxy Compound Other than the Component C)

C-4: Epoxidized soybean oil having a critical stress of 2 MPa according to the above evaluation method (NEWCIZER 510R, supplied by NOF Corporation).

(Component D)

D-1: Ultraviolet absorbent (2-(2-hydroxy-5-tert-octylphenyl)benzotriazole: ChemiSorb 79, supplied by Chemiprokasei Kaisha, Ltd.).

D-2: Ultraviolet absorbent (2,2'-p-phenylenebis(3,1-benzooxazin-4-one) (UV-0901, supplied by Kinkai Chemicals Co., Ltd.).

D-3: Ultraviolet absorbent (2-(4,6-diphenyl-1,3,5-triazin-2-yl)-5-[(hexyl)oxy]-phenol: TINUVIN1577, supplied by Ciba Japan K.K.).

(Component E)

E-1: Phosphonite thermal stabilizer (main component tetrakis(2,4-di-tert-butylphenyl)-4,4'-biphenylene diphosphonite: Hostanox P-EPQ, supplied by Clariant (Japan) K.K.).

E-2: Phosphite-containing thermal stabilizer (tris(2,4-di-tert-butylphenyl)phosphite, IRGAFOS 168, supplied by Ciba Japan K.K.)

(Component F)

F-1: Hindered-phenol-containing antioxidant (n-octadecyl-3-(3,5-di-tert-butyl-4-hydroxyphenyl)propionate: IRGANOX 1076, supplied by Ciba Japan K.K.)

(Other Additive)

H-1: Bluing agent (Anthraquinone-containing compound of the following formula: MACROREX Violet B, supplied by Bayer Chemicals Japan K.K.

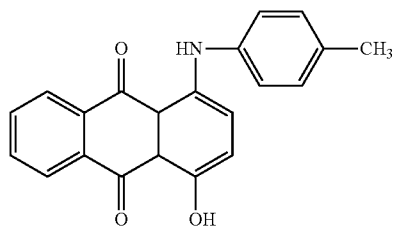 [SMILES: Cc1ccc(NC2=CC=C(O)C3C(=O)c4ccccc4C(=O)C23)cc1]

(Composition for Hard Coating)
(Synthesis of Acryl Copolymer Solution (A))

A flask having a reflux condenser and a stirrer and having its internal atmosphere replaced with nitrogen was charged with 79.9 parts of ethyl methacrylate, 33.6 parts of cyclohexyl methacrylate, 13.0 parts of 2-hydroxyethyl methacrylate, 126.6 parts of methyl isobutyl ketone (to be abbreviated as "MIBK" hereinafter) and 63.3 parts of 2-butanol (to be abbreviated as "2-BuOH" hereinafter), and these were mixed. A nitrogen gas was introduced into the mixture for 15 minutes to remove oxygen, and the temperature thereof was increased to 70° C. under the current of nitrogen gas, followed by adding 0.33 part of azobisisobutyronitrile (to be abbreviated as "AIBN" hereinafter). And, the mixture was allowed to react under the current of nitrogen gas at 70° C. for 5 hours. Further, 0.08 part of AIBN was added, the temperature was increased to 80° C. and the mixture was reacted for 3 hours, to give an acryl copolymer solution (A) having a non-volatile content concentration of 39.6%. The acryl copolymer had a weight average molecular weight of 125,000 in terms of polystyrene on the basis of GPC measurement (column: Shodex GPCA-804, eluant: chloroform).

(Preparation of Acrylic Resin Coating Composition (i-1))

To 100 parts of the above acryl copolymer solution (A) were added 43.2 parts of MIBK, 21.6 parts of 2-BuOH and 83.5 parts of 1-methoxy-2-propanol, and they were mixed. 5.3 Parts of TINUVIN 400 (triazine-containing ultraviolet absorbent, supplied by Ciba Specialty Chemicals K.K.) and 10.6 parts of VESTANAT B1358/100 (polyisocyanate compound precursor, supplied by Degussa Japan K.K.) were added to ensure that the isocyanate groups became in an amount of 1.0 equivalent weight per equivalent weight of hydroxy groups of acryl copolymer of the acrylic resin solution (A), further, 0.015 part of tin dimethyldineodecanoate (DMDNT) was added, and they were stirred at 25° C. for 1 hour to give an acrylic resin coating composition (i-1).

(Preparation of Organosiloxane Resin Coating Composition (ii-1))

1.3 Parts of 1M hydrochloric acid was added to 133 parts of a water-dispersible colloidal silica dispersion (CATALOID SN-30, a solid content concentration 30% by weight, supplied by Shokubai Kasei Kogyo K.K.), and they were fully stirred. This dispersion was cooled to 10° C., and while it was cooled with an ice water bath, 162 parts of methyltrimethoxysilane was dropwise added. Immediately after the dropwise addition of the methyltrimethoxysilane, the temperature of the mixture started to increase due to a reaction heat, and five minutes after the start of the dropwise addition, the temperature increased up to 60° C., followed by a gradual decrease in the temperature of the mixture owing to the effect produced by the cooling. At a state when the temperature of the mixture reached 30° C., and while this temperature was maintained, the mixture was stirred for 10 hours. To this were added 0.8 part of a methanol solution having a choline concentration of 45% by weight as a curing catalyst, 5 parts of acetic acid as a pH adjuster and 200 parts of isopropyl alcohol as a solvent for dilution, and they were mixed to give an organosiloxane resin coating composition (ii-1).

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| composition | Component A | A-1 | 100 | 100 | 100 | 100 | 100 | 100 | 100 | 100 |
| | | A-2 | | | | | | | | |
| | Component B | B-1 | 0.2 | 0.2 | 0.2 | 0.2 | 0.2 | 0.5 | 0.1 | 0.2 |
| | | B-2 | | | | | | | | |
| | Component C | C-1 | 0.03 | | | | 0.005 | 0.1 | 0.03 | 0.03 |
| | | C-2 | | 0.03 | | | | | | |
| | | C-3 | | | 0.03 | | | | | |
| | | C-4 | | | | | | | | |
| | Component D | D-1 | 0.3 | 0.3 | 0.3 | 0.3 | 0.3 | 0.3 | 0.3 | 0.2 |
| | | D-2 | | | | | | | | |
| | | D-3 | | | | | | | | |
| | Component E | E-1 | 0.03 | 0.03 | 0.03 | 0.03 | 0.03 | 0.03 | 0.03 | 0.03 |
| | | E-2 | | | | | | | | |
| | Component F | F-1 | | | | | | | | |
| | Other | H-1 | 0.5 ppm | 0.5 ppm | 0.5 ppm | 0.5 ppm | 0.5 ppm | 0.5 ppm | 0.5 ppm | 0.5 ppm |
| Properties | Transparency | Haze(%) | 0.2 | 0.2 | 0.2 | 0.2 | 0.2 | 0.4 | 0.2 | 0.2 |
| | Weatherability | ΔYI | 6.8 | 6.7 | 6.8 | 6.5 | 6.5 | 6.4 | 6.5 | 7.8 |
| | Resistance to boiling water | ΔHaze | 0.3 | 0.3 | 0.3 | 0.6 | 0.2 | 0.3 | 0.3 | 0.3 |
| | Resistance to molding heat | ΔE | 0.3 | 0.3 | 0.3 | 0.3 | 0.5 | 0.5 | 0.3 | 0.3 |
| | Releasability from mold | Load for releasability(N) | 1660 | 1660 | 1680 | 1680 | 1640 | 1090 | 2110 | 1680 |
| | Breaking during molding | Visual observation | ○ | ○ | ○ | ○ | ○ | ○ | ○ | ○ |
| | Breaking after application of hard coating | Visual observation | ○ | ○ | ○ | ○ | ○ | ○ | ○ | ○ |

TABLE 1-continued

|  |  |  |  |  |  |  |  |  |  |
|---|---|---|---|---|---|---|---|---|---|
| Strain in molded article | Visual observation | ○ | ○ | ○ | ○ | ○ | ○ | ○ | ○ |
| Corrosiveness of mold | Visual observation | ○ | ○ | ○ | ○ | ○ | ○ | ○ | ○ |

|  |  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| composition | Component A | A-1 | 100 | 100 | 100 | 100 | 100 | 100 | 100 |  |
|  |  | A-2 |  |  |  |  |  |  |  | 100 |
|  | Component B | B-1 | 0.2 | 0.2 | 0.2 | 0.2 | 0.2 | 0.2 | 0.2 | 0.2 |
|  |  | B-2 |  |  |  |  |  |  |  |  |
|  | Component C | C-1 | 0.03 | 0.03 | 0.03 | 0.03 | 0.01 | 0.01 | 0.01 | 0.01 |
|  |  | C-2 |  |  |  |  |  |  |  |  |
|  |  | C-3 |  |  |  |  | 0.01 |  |  |  |
|  |  | C-4 |  |  |  |  |  |  |  |  |
|  | Component D | D-1 |  |  |  | 0.3 | 0.3 | 0.3 | 0.3 | 0.3 |
|  |  | D-2 | 0.3 |  |  |  |  |  |  |  |
|  |  | D-3 |  | 0.3 |  |  |  |  |  |  |
|  | Component E | E-1 | 0.03 | 0.03 | 0.01 |  | 0.03 | 0.03 | 0.03 | 0.03 |
|  |  | E-2 |  |  |  | 0.03 |  |  | 0.03 | 0.03 |
|  | Component F | F-1 |  |  |  |  |  | 0.05 | 0.03 | 0.03 |
|  | Other | H-1 | 0.5 ppm | 0.5 ppm | 0.5 ppm | 0.5 ppm | 0.5 ppm | 0.5 ppm | 0.5 ppm | 0.5 ppm |
| Properties | Transparency | Haze(%) | 0.2 | 0.2 | 0.2 | 0.2 | 0.2 | 0.2 | 0.2 | 0.2 |
|  | Weatherability | $\Delta$YI | 6.6 | 6.2 | 6.7 | 6.7 | 6.8 | 6.7 | 6.6 | 6.5 |
|  | Resistance to boiling water | $\Delta$Haze | 0.3 | 0.3 | 0.3 | 0.3 | 0.3 | 0.4 | 0.4 | 0.4 |
|  | Resistance to molding heat | $\Delta$E | 0.3 | 0.3 | 0.5 | 0.4 | 0.3 | 0.3 | 0.2 | 0.2 |
|  | Releasability from mold | Load for releasability(N) | 1660 | 1660 | 1660 | 1660 | 1680 | 1650 | 1670 | 1640 |
|  | Breaking during molding | Visual observation | ○ | ○ | ○ | ○ | ○ | ○ | ○ | ○ |
|  | Breaking after application of hard coating | Visual observation | ○ | ○ | ○ | ○ | ○ | ○ | ○ | ○ |
|  | Strain in molded article | Visual observation | ○ | ○ | ○ | ○ | ○ | ○ | ○ | ○ |
|  | Corrosiveness of mold | Visual observation | ○ | ○ | ○ | ○ | ○ | ○ | ○ | ○ |

|  |  |  | C.Ex. 1 | C.Ex. 2 | C.Ex. 3 | C.Ex. 4 | C.Ex. 5 | C.Ex. 6 |
|---|---|---|---|---|---|---|---|---|
| composition | Component A | A-1 | 100 | 100 | 100 | 100 | 100 | 100 |
|  |  | A-2 |  |  |  |  |  |  |
|  | Component B | B-1 | 0.2 | 0.2 | 0.2 |  | 0.2 | 0.2 |
|  |  | B-2 |  |  |  | 0.2 |  |  |
|  | Component C | C-1 |  |  |  | 0.03 |  |  |
|  |  | C-2 |  |  |  |  |  |  |
|  |  | C-3 |  | 0.001 |  |  | 0.1 | 0.1 |
|  |  | C-4 |  |  | 0.1 |  |  |  |
|  | Component D | D-1 | 0.3 | 0.3 | 0.3 | 0.3 |  | 0.3 |
|  |  | D-2 |  |  |  |  |  |  |
|  |  | D-3 |  |  |  |  |  |  |
|  | Component E | E-1 | 0.03 | 0.03 | 0.03 | 0.03 | 0.03 |  |
|  |  | E-2 |  |  |  |  |  |  |
|  | Component F | F-1 |  |  |  |  |  |  |
|  | Other | H-1 | 0.5 ppm | 0.5 ppm | 0.5 ppm | 0.5 ppm | 0.5 ppm | 0.5 ppm |
| Properties | Transparency | Haze(%) | 0.2 | 0.2 | 0.2 | 0.2 | 0.2 | 0.2 |
|  | Weatherability | $\Delta$YI | 6.6 | 6.8 | 6.6 | 6.4 | 13.6 | 6.6 |
|  | Resistance to boiling water | $\Delta$Haze | 1.8 | 1.2 | 0.2 | 0.3 | 0.2 | 0.2 |
|  | Resistance to molding heat | $\Delta$E | 0.3 | 0.3 | 0.5 | 1.2 | 0.3 | 0.7 |
|  | Releasability from mold | Load for releasability(N) | 1660 | 1670 | 1640 | 1480 | 1640 | 1630 |
|  | Breaking during molding | Visual observation | ○ | ○ | x | x | ○ | ○ |
|  | Breaking after application of hard coating | Visual observation | ○ | ○ | x | x | ○ | ○ |
|  | Strain in molded article | Visual observation | ○ | ○ | Δ | x | ○ | ○ |
|  | Corrosiveness of mold | Visual observation | x | Δ | ○ | ○ | ○ | ○ |

Ex.: Example
C. Ex.: Comparative Example

As is clear from Table 1, the resin composition of this invention is excellent in transparency, weatherability, resistance to boiling water, resistance to molding heat and releasability from a mold, has a strain in a molded article reduced, and is improved in breaking durability of a molded article.

Effect of the Invention

The resin composition and the molded article of this invention are excellent in transparency, weatherability, resistance to boiling water, resistance to molding heat and releasability from a mold. Further, the molded article of this invention has an internal strain reduced, and is excellent in breaking durability.

INDUSTRIAL APPLICABILITY

The molded article formed from the resin composition of this invention is useful as transparent members for a vehicle such as a headlamp lens and a resin window for a vehicle.

Owing to its inherent features, further, the resin composition of this invention can be used in broad fields other than the transparent members for a vehicle, such as fields of a window glass of a construction machine, a window glass of a building, a house and a green house, a roof of a garage and arcade, a lens for a panel lamp, a traffic light lens, a lens of an optical apparatus, a mirror, ophthalmic glasses, goggles, a sound deadening wall, a windshield for a bike, a name plate, a solar cell cover or solar cell substrate, a cover for a display, a touch panel and parts (a circuit cover, a chassis, a pachinko ball or Japanese pinball carrier guide) for game machines (a pachinko or Japanese pinball machine). Therefore, the resin composition of this invention is useful in various fields such as fields of various electric and electronic machines, office-automation machines and equipment, parts for vehicles, machine parts and others including agricultural materials, fishery materials, shipping containers, packaging containers, play tools and sundry goods.

The invention claimed is:

1. A resin composition comprising
(A) 100 parts by weight of a polycarbonate resin (component A),
(B) 0.005 to 1 part by weight of an ester (component B) of pentaerythritol and an aliphatic carboxylic acid composed mainly of stearic acid and palmitic acid,
(C) 0.003 to 0.2 part by weight of an epoxy compound (component C) selected from the group consisting of a copolymer of methyl methacrylate and glycidyl methacrylate, and a copolymer of styrene and glycidyl methacrylate,
(D) 0.01 to 1 part by weight of an ultraviolet absorbent (component D), and
(E) 0.001 to 0.5 part by weight of a phosphorus stabilizer (component E),
wherein the component B and the component C have a critical stress of 12 MPa or more each when they are treated at a temperature of 120° C. for 24 hours in a one/fourth ellipse test method using a bisphenol A type polycarbonate resin sheet that is produced by a melt-extrusion method and has a viscosity average molecular weight of 24,500.

2. The resin composition of claim 1, which contains 0.001 to 0.5 part by weight, per 100 parts by weight of the polycarbonate resin (component A), of a hindered-phenol stabilizer (component F).

3. The resin composition of claim 1, wherein the phosphorus stabilizer (component E) is at least one compound selected from a phosphite compound and a phosphonite compound.

4. The resin composition of claim 3, which contains 0.001 to 0.5 part by weight, per 100 parts by weight of the polycarbonate resin (component A), of a hindered-phenol stabilizer (component F).

5. A molded article obtained by injecting-molding the resin composition recited in claim 1.

6. The molded article of claim 5, which is a transparent member for a vehicle.

7. A molded article obtained by injecting-molding the resin composition recited in claim 3.

8. A molded article obtained by injecting-molding the resin composition recited in claim 2.

9. A molded article obtained by injecting-molding the resin composition recited in claim 4.

10. The molded article of claim 7, which is a transparent member for a vehicle.

11. The molded article of claim 8, which is a transparent member for a vehicle.

12. The molded article of claim 9, which is a transparent member for a vehicle.

* * * * *